Feb. 12, 1946.   D. M. PHILLIPS   2,394,715
SWIVEL COUPLING
Filed Jan. 28, 1943
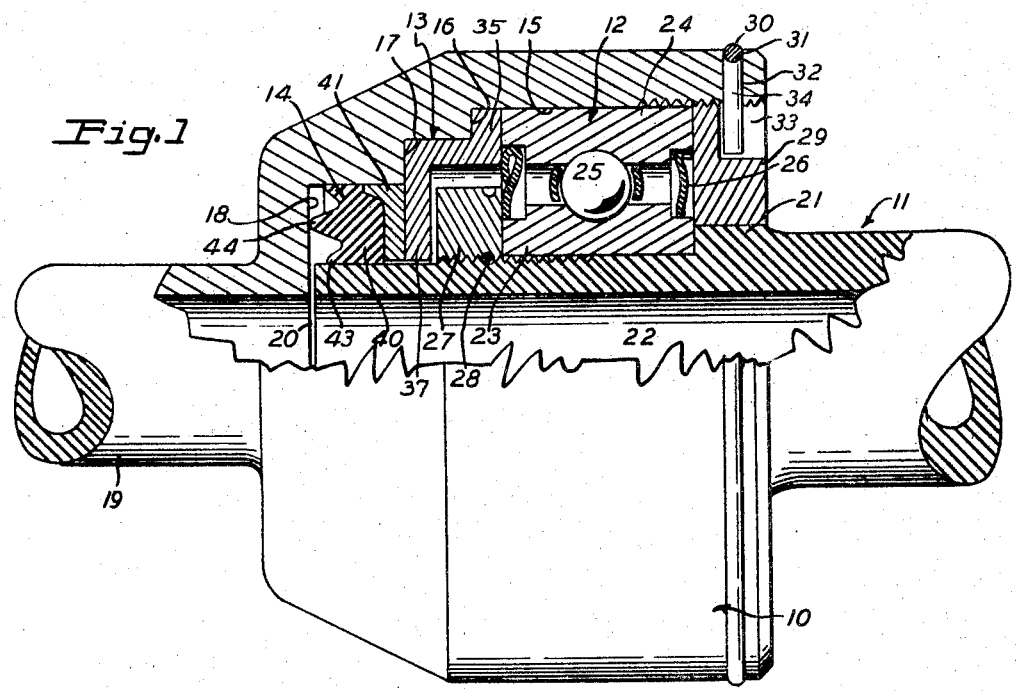
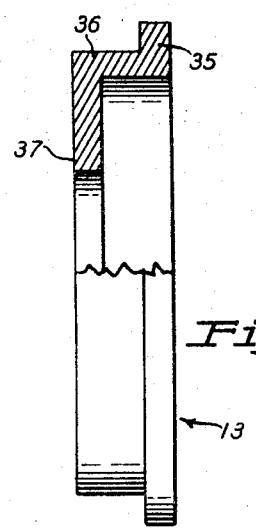
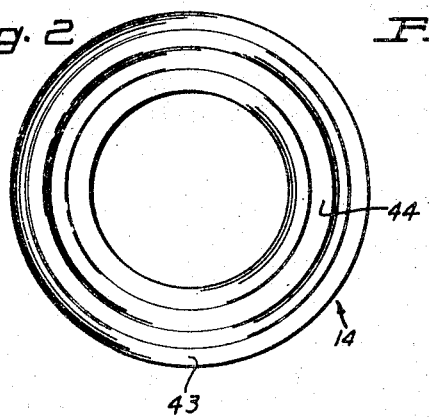
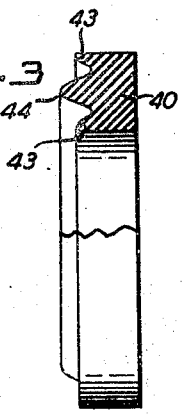
Inventor
Dwight M. Phillips
By
Atty.

Patented Feb. 12, 1946

2,394,715

UNITED STATES PATENT OFFICE 2,394,715

SWIVEL COUPLING

Dwight M. Phillips, Fullerton, Calif., assignor to Chiksan Tool Company, Brea, Calif., a corporation of California Application January 28, 1943, Serial No. 473,769

12 Claims. (Cl. 285—97.3)

This invention relates to fluid conducting joints and relates more particularly to fluid conducting swivel joints. A general object of this invention is to provide a practical, effective and inexpensive fluid handling swivel coupling.

Fluid conducting swivel joints of the general class with which this invention is concerned usually embody an anti-friction bearing for connecting the sections for free relative rotation and packing means for preventing the leakage of fluid from between the sections. It is necessary to accurately machine the parts which receive the packing means and it is desirable that the joint sections be formed so that the packing means may be readily inserted through the mouth of the outer section or socket section. In view of these considerations it has been the usual practice to arrange the packing means in the socket section behind the bearing. As a result of this relationship between the packing means and bearing the fluid pressure which acts on the packing means is directly transmitted to the bearing, thus subjecting the bearing to excessive end thrusts and additional wear.

Another object of the invention is to provide an anti-friction swivel joint for conducting fluid that embodies a novel thrust means for transmitting the axial thrusts resulting from the fluid pressure acting on the packing means to the outer section, thus relieving the anti-friction bearing of these loads.

Another object of this invention is to provide a swivel coupling of the character referred to in which the means for transmitting the axial thrusts from the packing means to the body section comprises a simple, one-piece thrust ring.

Another object of this invention is to provide a coupling of the character mentioned in which the provision of the thrust ring allows the sealing means and the bearing to be arranged in the most advantageous positions and permits the simplification of the entire joint.

A further object of this invention is to provide a swivel coupling embodying an improved sealing ring that is particularly effective in preventing the escape of fluid under pressure and that does not become distorted after extensive use or when subjected to reduced or negative pressures. It has been found that sealing rings embodying feather edges acted upon by the fluid pressure are most effective in this class of swivel joints but the lips or feather edges of such sealing rings often become crowded against the end wall of the socket and made inoperative. When the coupling is handling negative pressure the sealing lips tend to draw together and to become distorted. The improved sealing ring of the invention embodies the highly effective feather edge sealing lips and is formed so that these lips cannot be distorted or crowded against the socket wall or pulled together by the action of reduced pressure.

The various objects and features of my invention will be fully understood from the following detailed description of a typical preferred form and application of the invention, throughout which description reference is made to the accompanying drawing, in which:

Fig. 1 is a longitudinal detailed sectional view of the coupling with a portion appearing in side elevation. Fig. 2 is an end elevation of the sealing ring removed from the coupling. Fig. 3 is a longitudinal cross section of the sealing ring with a part appearing in side elevation and Fig. 4 is a longitudinal detailed sectional view of the thrust member with a portion appearing in side elevation.

The swivel coupling of the present invention may be said to comprise, generally, an outer section 10, an inner section 11, an anti-friction bearing 12 connecting the sections for free relative rotation, a thrust member 13 at the inner side of the bearing 12, and sealing means 14 at the inner side of the thrust member for preventing the leakage of fluid from between the sections.

The sections 10 and 11 are tubular members for conducting fluid and are arranged in telescopic relation to form the body of the coupling. The outer section 10 may be termed the socket section and the inner section 11 may be termed the pin section. The outer section 10 is a cup or bell-shaped element and has a longitudinal socket 15 for receiving the inner section 11 and for containing the bearing 12 and the sealing means 14. The wall of the socket 15 is cylindrical and concentric with the longitudinal axis of the coupling and is stepped to have two annular shoulders 16 and 17 which face toward the mouth of the socket. The shoulders 16 and 17 are spaced a substantial distance inwardly from the mouth of the socket 15 and the two shoulders are in adjacent spaced relation. The inner end wall 18 of the socket 15 is spaced some distance from the innermost shoulder 17 and is preferably flat and normal to the longitudinal axis of the coupling. The outer section 10 is formed for connection with a fluid conductor, or the like. In the case illustrated the outer section 10 is provided with a tubular boss or extension 19.

The inner section 11 is an elongate tubular member received in the socket 15 with considerable clearance, leaving ample space to receive the bearing 12, the member 13 and the sealing means 14. The inner end of the section 11 is spaced from the end wall 18 leaving an annular gap 20 which admits fluid pressure to the socket 15 to actuate the sealing means 14. An external annular ridge or flange 21 is provided on the section 11 in the mouth portion of the socket 15. The section 11 extends outwardly beyond the socket 15 for connection with a pipe part or the like. The fluid passage 22 extending through the two sections 10 and 11 may be uniform in diameter and entirely unobstructed.

The bearing 12 serves to connect the sections 10 and 11 for free relative rotation. The antifriction bearing 12 comprises an inner race 23, an outer race 24 and a series of balls 25 engaged in opposing annular grooves in the races. Sealing rings 26 may be recessed in the ends of the races 23 and 24 to retain lubricant in the bearing. The inner bearing race 23 is engaged on the inner section 11 so that its outer end bears against the flange 21. A nut 27 is threaded on the inner section 11 and cooperates with the inner end of the race 23 to clamp the race against the flange 21. The race 23 held or clamped between the flange 21 and the nut 27 is rigid with the inner section 11. A pin 28 or other appropriate means serves to lock the nut 27 on the inner section 11.

The outer race 24 of the bearing 12 is received in the socket 15 to cooperate with its main wall. A tubular nut or ring 29 is threaded in the mouth of the socket 15 and cooperates with the outer end of the race 24. The inner face of the ring 29 may be in substantially the same plane as the inner side of the flange 21. The outer race 24 bears against the ring 29 for the transmission of axial thrusts in one direction. The other end of the race 24 cooperates with the thrust member 13 for the transmission of end thrusts in the other direction. Thus it will be seen that the bearing 12 connects the sections 10 and 11 for free relative rotation and positively holds the sections against relative axial movement in both directions.

Suitable means is provided for locking the threaded ring 29 against turning. In practice this means includes a spring ring 30 engaged in an annular groove 31 in the periphery of the outer section 10. Spaced radial openings 32 are provided in the wall of the section 10 to join the groove 31 and spaced radial notches 33 are provided in the ring 29 to register with the openings 32. There is an opening 32 registering with a notch 33 in every rotative position of the ring 29. The spring ring 30 has an inturned finger 34 which extends inwardly through an opening 32 and which engages in a notch 33 to lock the threaded ring 29 against turning.

The thrust member 13 is an important element of the invention. The element 13 is arranged in the socket 15 to cooperate with the inner end of the outer bearing race 24 so that the outer race is positively held against axial movement in both directions and the member 13 further serves as an abutment for the sealing means 14 and for the transmission of axial pressure from the sealing means to the outer bearing race 24. This last named function is particularly important as it relieves the relatively rotating parts of the bearing means 12 of the axial thrusts resulting from the action of the fluid pressure on the sealing means 14.

The thrust member 13 is a one-piece ring arranged in the stepped or shouldered portion of the socket 15. The member 13 is shaped to cooperate with both shoulders 16 and 17 and with the peripheral wall of the socket. As illustrated in Figs. 1 and 4 of the drawing the member 13 has what may be considered a radial outer end flange 35 whose inner side bears on the shoulder 16 and whose periphery cooperates with the main wall of the socket 15. The member 13 has an axial intermediate portion 36 that is tubular and cylindrical to cooperate with the wall of the socket 15 between the shoulders 16 and 17. The member 13 further has an inturned annular lip or apron 37 which extends inwardly toward the inner section 11. One face of the apron 37 bears on the shoulder 17 while the other face of the apron is spaced from and clear of the nut 27, this being clearly shown in Fig. 1. The apron 37 is also clear of the inner section 11. When the nut or ring 29 is threaded against the outer race 24, the member 13 is clamped between the race 24 and the shoulders 16 and 17 and acts as a spacer or abutment for definitely stopping the outer race and for holding it against axial movement in one direction.

The sealing means 14 serves to prevent the leakage of fluid from between the sections 10 and 11 and in accordance with the invention is actuated by the fluid pressure from the line. The means 14 includes a sealing ring 40 and a backing ring 41. The rings 40 and 41 are arranged in the socket 15 between the apron 37 and the inner wall 18. The walls and surfaces defining the space which receives the sealing means 14 are smooth and accurately machined to reduce the wear to a minimum. It will be observed that the portion of the inner section 11 which is engaged by the sealing means 14 is unthreaded and smooth. The backing ring 41 bears against the inner face of the apron 37 and is engaged with the peripheral wall of the socket 15 adjacent the shoulder 17. The ring 41 is thickened at its periphery to have an inwardly projecting lip which extends a short distance along the wall of the socket. The backing ring 41 may be formed of bronze, brass, or other appropriate material.

The sealing ring 40 is a feature of the invention. The ring 40 is an annular body of elastic or yielding resilient material such as rubber, rubber composition, synthetic rubber, or the like. The sealing ring 40 is arranged behind the backing ring 41 and is shaped to most effectively seal with the external surface of the inner section 11 and the socket wall of the outer section 10. The ring 40 also bears and seals against the backing ring 41 but is spaced from the end wall 18 so that its entire inner face is exposed to the fluid under pressure admitted to the socket by the gap 20. The sealing ring 40 is provided with inner and outer annular sealing lips 43 for sealing with the external surface of the inner section 11 and the peripheral wall of the socket 15. The inner or opposing sides of the lips 43 taper or curve outwardly toward their peaks so that the lips may be said to be feather edged although in practice the lips may have narrow, blunt, or rounded edges. As the ring 40 is initially formed the lips 43 may flare or diverge slightly so that when the ring is installed in its active position the resiliency of the sealing ring material urges the lips 43 outwardly to maintain them in effective sealing cooperation with the surfaces of the sections 10 and 11. The fluid pressure acting on the exposed surfaces of the lips 43 is the principal actuating force for tightly holding the lips against the surfaces of the sections 10 and 11 to positively prevent the leakage of fluid past the sealing ring.

As will be seen from an inspection of Figs. 1 and 3 of the drawings there is a substantial annular space between the sealing lips 43. The invention provides a central concentric annular ridge 44 in this spaced or trough. The ridge 44 may be equally spaced between the sealing lips 43 and a space or groove occurs between the ridge and each sealing lip. The ridge 44 is of substantial thickness at its base and its opposite sides converge outwardly. In accordance with the invention the ridge 44 projects beyond the extremities of the lips 43. Thus the peak or edge of the ridge 44 is adjacent the end wall 18 while the lips 43 are spaced a substantial distance away from the end wall. The ridge 44 serves as a spacer to prevent the sealing lips 43 from being crowded against the end wall 18 and distorted from such engagement. The ridge 44 also provides a substantial mass of resilient material between the bases of the lips 43 and this mass of material effectively resists all tendency for the lips 43 to collapse or draw together. Accordingly the ridge 44 prevents distortion of the lips 43 through engagement with the end wall 18 and through movement toward one another when the sealing means is subjected to negative pressures and under all other operating conditions.

It is believed that the operation of the coupling will be readily understood from the foregoing detailed description. The coupling is extremely simple and is easily assembled. During operation the bearing 12 connects the sections 10 and 11 for free relative rotation and the sealing ring 40 prevents the leakage of fluid under pressure from between the sections. In this connection it should be observed that the ring 40 remains stationary with respect to the outer section 10 because of its extensive engagement with the wall of the socket 15 and the backing ring 41, and the sealing ring has only limited engagement with the inner section 11. Thus there is only a very limited wearing surface on the sealing ring 40 and there is little or no tendency for the ring to become distorted through torsional strains. As above described the ridge 44 protects the sealing lips 43 against engagement with the end wall 18 and assists in holding the sealing lips outwardly against the surfaces of the sections 10 and 11. The axial forces applied to the sealing ring 40 by the fluid under pressure are transmitted to the thrust member 13. The member 13 in turn directly transmits these forces to the outer race 24 of the bearing 12 and the race carries the forces to the threaded ring 29. Accordingly, the relatively rotating parts of the bearing 12 are not subjected to the axial forces resulting from the fluid pressure acting upon the sealing ring 40. The bearing 12 and the packing means 14 are both made readily accessible upon the removal or unthreading of the ring 29 and the several parts may be easily and quickly replaced when worn.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my inventory, I claim:

1. A fluid conducting swivel coupling including a tubular outer section having a socket, the wall of the socket having an axially and outwardly facing shoulder, a tubular inner section entering the socket and having a pair of opposing external shoulders, a thrust member in the socket engaged with said shoulder and supported by the shoulder to be held against inward movement, an anti-friction bearing for connecting the sections for free relative rotation and holding the sections against relative axial movement in both directions, the bearing including an inner race engaged on the inner section between said opposing shoulders, an outer race seated directly in the socket and having one end engaged with the thrust member and anti-friction elements engaged between the races, a ring screw threaded in the socket and engaging the other end of the outer race to clamp the outer race against the thrust member, the thrust member having a radially inwardly projecting flange portion spaced axially from the innermost shoulder on the inner section and sealing means in the socket having only radial engagement with the inner section and actuated by fluid pressure acting outwardly toward the mouth of the socket to seal with the two sections and wholly supported axially against such pressure by the inner side of the flange portion of the thrust member whereby only the end of the inner section is exposed to force tending to move the sections apart.

2. In a fluid conducting swivel coupling including a tubular outer section having a socket, the wall of the socket having an axially facing shoulder, a tubular inner section entering the socket and having a pair of opposing external shoulders, an anti-friction bearing for connecting the sections for free relative rotation and holding the sections against relative axial movement in both directions, the bearing including an inner race engaged on the inner section between said opposing shoulders, an outer race having one end facing the shoulder in the socket and anti-friction elements engaged between the races, and a ring removably secured in the socket and engaging the other end of the outer race, sealing means in the socket for sealing with the two sections including a thrust member in the socket held between the shoulder in the socket and the outer race, a rigid backing ring bearing against the inner end of the thrust member so the entire axial thrust of the sealing means is communicated to the thrust member, and a sealing ring wholly supported axially by the backing ring and having radial engagement with the inner section and pressed into sealing engagement with the two sections by fluid pressure.

3. In a tubular fluid conducting swivel coupling, an outer section having a socket, an inner section entering the socket, the inner end of the inner section being spaced from the inner end wall of the socket to leave a gap which admits fluid pressure to the socket, an abutment projecting from the side wall of the socket and spaced from its end wall, and sealing means bearing axially against the abutment and actuated by the fluid pressure including a sealing ring of resilient material having spaced annular lips, one sealing radially inward against the inner section, the other sealing radially outward against the outer section, and a part spaced between the lips and projecting beyond the lips toward the end wall of the socket to prevent said lips from contacting said end wall.

4. In a tubular fluid conducting swivel coupling, an outer section having a socket, an inner section entering the socket, the inner portion of the socket being in communication with the interiors of the sections to receive fluid pressure therefrom, an abutment in the socket spaced from the inner wall of the socket, and a sealing ring of resilient material axially supported by the abutment in the inner portion of the socket and surrounding the inner section, the sealing ring having an inner sealing lip projecting toward said end wall of the socket and actuated by the fluid pressure to seal radially with the inner section, an outer sealing lip projecting toward said end wall and actuated by the fluid pressure to seal with the side wall of the socket, and an annular ridge spaced between said lips and projecting beyond said lips toward said end wall.

5. A swivel coupling adapted to conduct fluid pressure including a tubular outer section having a socket, a tubular inner section received in the socket and having a turned inner end portion, a bearing connecting the sections for relative rotation including an inner race held on the inner section, an outer race engaged in the socket to be held against axial movement in one direction relative to the outer section and anti-friction elements engaged between the faces, a thrust member engaged in the socket and cooperating with the outer race to hold the same against axial movement in the other direction, the thrust member being axially spaced from the inner race to be clear of the inner race, a retainer for the inner race located on the inner section between the inner race and the outer side of the thrust member, and sealing means in the socket having contact with the inner section only at the exterior of said turned portion thereof, the sealing means being forced axially against the outer side of the thrust member by fluid pressure which actuates it to seal between the sections.

6. A swivel coupling adapted to conduct fluid pressure including a tubular outer section having a socket, a tubular inner section received in the socket, a bearing connecting the sections for relative rotation including an inner race held on the inner section, an outer race engaged in the socket to be held against axial movement in one direction relative to the outer section and anti-friction elements engaged between the faces, a thrust member engaged in the socket and cooperating with the outer race to hold the same against axial movement in the other direction, the thrust member having an outer portion engaging the end of the outer race and having an inner portion axially offset from the outer portion to be axially spaced from the inner race to be axially removed from the inner race, and sealing means in the socket forced axially against the thrust member by fluid pressure which actuates it to engage and seal the sections only radially.

7. A swivel coupling adapted to conduct fluid pressure including a tubular outer section having a socket, a tubular inner section received in the socket, a bearing connecting the sections for relative rotation including an inner race held on the inner section, an outer race engaged in the socket to be held against axial movement in one direction relative to the outer section and anti-friction elements engaged between the races, a thrust member in the socket holding the outer race against axial movement in the other direction relative to the outer section, the socket having a portion continuing inward beyond the thrust member and the inner section having a turned portion continuing inward of the thrust member, and a packing engaging the thrust member so the thrust member is the sole support for the packing in an axial direction and engaging said portions of the socket and inner member to seal directly between the inner and outer sections independently of the bearing.

8. A swivel coupling adapted to conduct fluid pressure including a tubular outer section having a socket, a tubular inner section received in the socket, a bearing connecting the sections for relative rotation including an inner race held on the inner section, an outer race engaged in the socket to be held against axial movement in one direction relative to the outer section and anti-friction elements engaged between the races, a thrust member in the socket holding the outer race against axial movement in the other direction relative to the outer section, the socket having a portion continuing inward beyond the thrust member and the inner section having a portion continuing inward of the thrust member, and a packing engaging the thrust member so the thrust member is the sole support for the packing in an axial direction and engaging said portions of the socket and inner member to seal directly between the inner and outer sections independently of the bearing, the packing having only radial engagement with the part that moves relative to it.

9. A swivel coupling adapted to conduct fluid pressure including a tubular outer section having a socket, a tubular inner section received in the socket, a bearing connecting the sections for relative rotation including an inner race held on the inner section, an outer race engaged in the socket to be held against axial movement in one direction relative to the outer section and anti-friction elements engaged between the races, a thrust member in the socket holding the outer race against axial movement in the other direction relative to the outer section, a retainer threaded to the inner end portion of the inner section between the bearing and thrust member to hold the inner race on the inner section, and packing means in the socket supported by the thrust member and sealing between the two sections.

10. A swivel coupling adapted to conduct fluid pressure including a tubular outer section having a socket, a tubular inner section received in the socket, a bearing connecting the sections for relative rotation including an inner race held on the inner section, an outer race engaged in the socket to be held against axial movement in one direction relative to the outer section and anti-friction elements engaged between the races, a thrust member in the socket holding the outer race against axial movement in the other direction relative to the outer section, a retainer applied to the inner end portion of the inner section between the bearing and thrust member to hold the inner race on the inner section, and packing means in the socket supported by the thrust member and sealing between the two sections, the inner section having a reduced inner end portion finished to operate in the packing means.

11. In a swivel coupling for handling fluid and having a tubular outer section with a socket, a tubular inner section received in the socket, and bearing means between the sections including an outer race held in the socket, means for sealing between the sections comprising a thrust member interposed between the socket and outer race and having a part projecting radially inward from the outer race and packing means maintained in the socket by said part of the thrust member and actuated by fluid pressure to seal between the sections and exterting radial sealing pressure against the inner section whereby only the end of the inner section is exposed to force tending to move the sections apart.

12. In a swivel coupling for handling fluid and having a tubular outer section with a socket, a tubular inner section received in the socket and having an inwardly facing shoulder, and bearing means between the sections including an outer race held in the socket, an inner race engaging the shoulder, balls between the races, and a member on the inner section inward of the inner race holding the inner race on the ineer section, means for sealing between the sections comprising a thrust member interposed between the socket and outer race and having a part projecting radially inward from the outer race to overlie and be axially spaced from the said member and packing means maintained in the socket by said part of the thrust member and actuated by fluid pressure to seal between the sections and exerting radial sealing pressure against the inner section whereby only the end of the inner section is exposed to force tending to move the sections apart.

DWIGHT M. PHILLIPS.